No. 897,620. PATENTED SEPT. 1, 1908.
F. H. C. HEYN.
APPARATUS FOR RECOVERING SUBMERGED OBJECTS.
APPLICATION FILED APR. 20, 1908.

Witnesses:
P. F. Nagle
H. S. Dieterich

Inventor:
Friedrich Hermann Carl Heyn,
By Wiedersheim & Fairbanks,
Attorneys.

UNITED STATES PATENT OFFICE.

FRIEDRICH HERMANN CARL HEYN, OF HAMBURG, GERMANY.

APPARATUS FOR RECOVERING SUBMERGED OBJECTS.

No. 897,620.     Specification of Letters Patent.     Patented Sept. 1, 1908.

Application filed April 20, 1908. Serial No. 428,033.

*To all whom it may concern:*

Be it known that I, FRIEDRICH HERMANN CARL HEYN, gentleman, German subject, residing at No. 14 Averhoffstrasse, Hamburg, Germany, have invented new and useful Improvements in Apparatus for Recovering Submerged Objects, of which the following is a specification.

My invention relates to apparatus for grappling submarine cables or other sunken objects.

According to this invention a so-called "water-kite", such as is employed for sinking sounding-apparatus, and consisting of a box-shaped body, open at both ends and having lateral apertures, is attached to a drag-line in such manner that the current of water acts upon the inner and outer walls of the box presented to it and thus always causes the apparatus to descend. Such a water-kite apparatus possesses numerous inherent advantages, and to adapt it for the objects in view I construct it in a peculiar manner. For this purpose the bottom part of the box is made heavier than the top part, which may conveniently be done by making the lower portion of iron and the upper portion of wood, whereby stability in floating is promoted.

The lower part of the box is provided with a hooked projection to enable a cable or other object lying on the ground to be seized. The bottom part of the box is also furnished with cross-bars so as to constitute a kind of grating, to prevent seaweed, stones and the like from entering the interior. To that edge of the box which is located diagonally opposite the hook there is secured an auxiliary line by means of which the device can be drawn up on end, so as to release it, when necessary, from the cable or the like being fished up.

My invention is illustrated in the accompanying drawing, in which one form of construction of the apparatus is shown.

Figure 1:
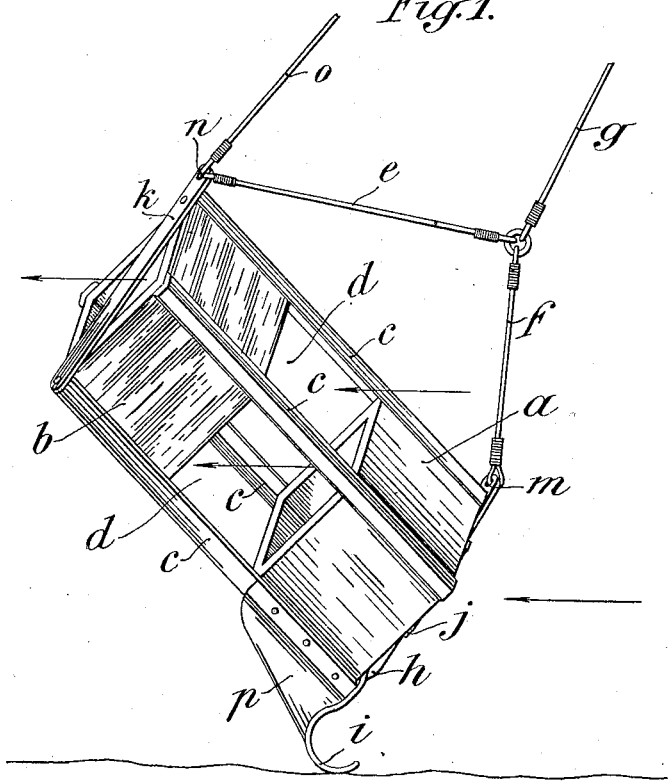
Figure 2:
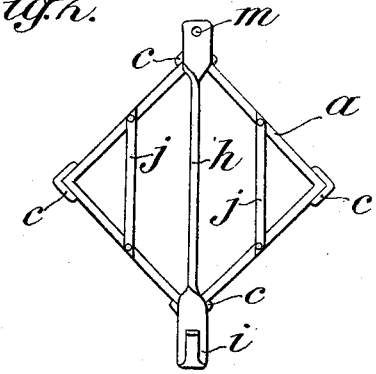

Figure 1 is a perspective view showing the apparatus in operative position in the water. Fig. 2 is an elevation of the hooked end of the apparatus.

The apparatus consists of a lower box-shaped part $a$, which may suitably be made of galvanized iron, and of an upper part $b$ constructed of boards secured together in box-form. The two parts $a\ b$ are connected by iron bars $c$ in such manner that apertures $d$ are left between the two parts $a\ b$. The composite body $a\ b\ c$ is attached by means of the ropes $e\ f$ to the drag-line $g$, in such manner that on being drawn through the water it assumes the canted position shown in Fig. 1, in which the current of water (whose direction is indicated by the arrows in Fig. 1) acts against the inner and outer surfaces of the walls $a\ b$ presented to it and thus always tends to force the apparatus down. To the bottom part $a$ there is secured the bar $h$, whose one end forms a hook $i$, while the other end has a lug, perforated at $m$, to receive the rope $f$. Parallel to the bar $h$ two bars $j\ j$ (Fig. 2) are provided, so that a species of grating is constituted which obstructs the entrance of seaweed, stones, etc. into the interior of the apparatus. To the top part $b$ of the apparatus there is affixed parallel to the bar $h$, a bar $k$ having an eye $n$ to receive the other rope $e$. This eye $n$ also serves for attachment of the line $o$. When this auxiliary line $o$ is pulled, the apparatus can be brought into erect position, whereby the hook $i$ can, when necessary, be released from the cable or the like being recovered.

In order to still further assist the apparatus in assuming the position shown in Fig. 1, the device may be loaded by means of a special weight $p$, adjacent to the hook.

Having thus described my invention, I claim as new:

1. An apparatus for recovering submerged objects, comprising a box-shaped body open at both ends, one of which is hooked, and having lateral apertures, and means for attaching a drag-line to the body, in such manner that the latter assumes an inclined position with the hooked end downward, the current acting against the inner and outer body-walls presented to it, serving to cause the apparatus to sink, substantially as described.

2. An apparatus for recovering submerged objects, comprising a box-shaped body presenting an open-ended hooked metal frame at one extremity, and an open-ended wooden frame at the opposite extremity, with gaps between the two frames, and means for attaching a drag-line to the body, in such manner that the latter assumes an inclined position with the hooked end downward, the current acting against the inner and outer body-walls presented to it, serving to cause the apparatus to sink, substantially as described.

3. An apparatus for recovering submerged objects, comprising a box-shaped body presenting a terminal hooked metal frame having a grated extremity, and an open-ended wooden frame at the opposite end, with gaps between the two frames, and means for attaching a drag-line to the body, in such manner that the latter assumes an inclined position with the hooked end downward, the current acting against the inner and outer body-walls presented to it, serving to cause the apparatus to sink, substantially as described.

4. An apparatus for recovering submerged objects, comprising a box-shaped body open at both ends, one of which is hooked, and having lateral apertures, and means for attaching a drag-line to the body, in such manner, that the latter assumes an inclined position with the hooked end downward, the current acting against the inner and outer body-walls presented to it, serving to cause the apparatus to sink, and an auxiliary line attached to the hookless end of the apparatus, whereby the latter can be drawn into erect position when desired, substantially as described.

In witness whereof I have hereunto signed my name this 25th day of March 1908, in the presence of two subscribing witnesses.

FRIEDRICH HERMANN CARL HEYN.

Witnesses:
WERNER BRAHNS,
ERNEST H. L. MUMMENHOFF.